US007391473B2

(12) United States Patent
Takahashi

(10) Patent No.: US 7,391,473 B2
(45) Date of Patent: Jun. 24, 2008

(54) VIDEO DISPLAY METHOD OF VIDEO SYSTEM AND IMAGE PROCESSING APPARATUS

(75) Inventor: Koji Takahashi, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 533 days.

(21) Appl. No.: 10/852,162

(22) Filed: May 25, 2004

(65) Prior Publication Data

US 2004/0239810 A1   Dec. 2, 2004

(30) Foreign Application Priority Data

May 30, 2003   (JP)   ............................. 2003-155650

(51) Int. Cl.
*H04N 5/45* (2006.01)
(52) U.S. Cl. ...................................... 348/561
(58) Field of Classification Search ......... 348/563–566, 348/569, 584, 581, 589, 561; 345/629, 660
See application file for complete search history.

(56) References Cited

U.S. PATENT DOCUMENTS

| 5,142,616 | A | * | 8/1992 | Kellas et al. ................. 345/634 |
| 5,258,839 | A | * | 11/1993 | Bae ............................. 348/473 |
| 5,481,315 | A | * | 1/1996 | Matsunaga ................... 348/565 |
| 5,519,485 | A | * | 5/1996 | Ohtani et al. .................. 356/2 |
| 5,680,177 | A | * | 10/1997 | Abe ............................ 348/564 |
| 5,912,710 | A | * | 6/1999 | Fujimoto ..................... 348/445 |
| 6,016,139 | A | * | 1/2000 | Terasawa et al. ............ 345/169 |
| 6,288,752 | B1 | | 9/2001 | Saito et al. ................... 348/581 |
| 6,311,328 | B1 | * | 10/2001 | Miyazaki et al. .............. 725/37 |
| 6,356,314 | B1 | * | 3/2002 | Takebe ........................ 348/564 |
| 6,774,912 | B1 | * | 8/2004 | Ahmed et al. ............... 345/629 |
| 7,006,156 | B2 | * | 2/2006 | Hirase et al. ................. 348/600 |
| 7,119,850 | B2 | * | 10/2006 | Park ............................ 348/565 |
| 2004/0168185 | A1 | * | 8/2004 | Dawson et al. ................ 725/38 |

FOREIGN PATENT DOCUMENTS

| CN | 1246020 A | 3/2000 |
| CN | 1249613 A | 4/2000 |
| JP | 2003-101898 | 4/2003 |

* cited by examiner

*Primary Examiner*—Paulos M Natnael
(74) *Attorney, Agent, or Firm*—Fitzpatrick, Cella, Harper & Scinto

(57) ABSTRACT

Video information and sub-information pertaining to a partial image to be displayed on a small-screen monitor are input from a receiver, disk playback unit, or memory data reader. On the basis of the sub-information, a target region data extractor and target region setting unit extract and set a partial image. A partial enlargement processor enlarges the partial image and displays the enlarged image on the small-screen monitor.

13 Claims, 16 Drawing Sheets

(x1,y1)

VIDEO DISPLAY METHOD OF VIDEO SYSTEM AND IMAGE PROCESSING APPARATUS

FIELD OF THE INVENTION

The present invention relates to a technique which displays input video information.

BACKGROUND OF THE INVENTION

With the advance of the liquid crystal display techniques, portable liquid crystal television receivers having screen sizes of 2 to 4 inches are commercialized, and the number of viewers who receive ordinary television broadcasting by using such small-screen liquid crystal television receivers is increasing. Also, ground-wave digital broadcasting is scheduled to be started in the near future, so portable apparatuses (e.g., Japanese Patent Application Laid-Open No. 2003-101898) capable of displaying broadcast digital images or digital images from the Internet are being developed.

On the other hand, various programs of ordinary television broadcasting are presumably produced by assuming receivers having screen sizes of about 14 to 30 inches.

Recently, HDTV (High Definition Television: high-quality television or high-resolution television) broadcasting is also started in addition to the ordinary broadcasting described above, in accordance with the introduction of the digital broadcasting techniques. With the start of the ground-wave digital broadcasting, the number of these HDTV programs will probably increase.

Programs of this HDTV are presumably produced by assuming screen sizes of about 30 to 50 inches or more as display conditions.

Additionally, the ability to display motion images of mobile apparatuses such as a cell phone, digital camera, camcorder, car navigation system, and notebook personal computer (PC) is rapidly advancing. Therefore, it is expected that motion images are generally played back on small screens of about 1.5 to 5 inches in the near future.

If, however, programs of the ordinary television broadcasting described above are viewed on portable liquid crystal television receivers of about 2 to 3 inches, the faces and expressions of cast are difficult to discriminate, and characters (e.g., signs in landscapes and headlines in papers) taken by cameras are difficult to read.

In particular, viewers will probably view programs of television broadcasting on cell phones and play back programs by using the DVD playback function of car navigation systems more often. Since the dependence on information acquisition from mobile apparatuses is thus increasing, it is necessary to alleviate the difficulties of viewing as described above.

Furthermore, with the progress of digital information, the resolution of motion images of, e.g., HDTV is more and more increasing as described above. This increases the difference between the expected display size when a program is produced and a small screen (as a part of diversification) which is the actual display size.

As a method of eliminating these inconveniences, an apparatus having a function of displaying an image by enlarging a part of the image during viewing is commercialized. However, a user must manually set the magnification and the (central) position of enlargement for each image. This can be done for still images by taking a certain time. For motion images, however, manually changing these two factors moment by moment is presumably a difficult operation which practically no general user is able to perform.

SUMMARY OF THE INVENTION

The present invention has been made to solve the above problems, and has as its object to enlarge a desired partial image and display the image on a small-screen display device without causing a user to perform any cumbersome operation.

To achieve the above object, according to an aspect of the present invention, there is provided a video display method of a video system for displaying input video information, comprising: a step of inputting video information, and sub-information pertaining to a partial image to be displayed on a small-screen display device; a step of enlarging the partial image on the basis of the input sub-information; and a step of displaying the enlarged partial image on the small-screen display device.

According another aspect of the present invention, there is provided an image processing apparatus for processing input image information, comprising: input means for inputting image information, and sub-information pertaining to a partial image to be displayed on a small-screen display device; processing means for enlarging the partial image on the basis of the input sub-information; and display control means for displaying the enlarged partial image on the small-screen display device.

Other features and advantages of the present invention will be apparent from the following description taken in conjunction with the accompanying drawings, in which like reference characters designate the same or similar parts throughout the figures thereof.

DETAILED DESCRIPTION OF THE PREFERRED EMBODIMENTS

Preferred embodiments of the present invention will now be described in detail in accordance with the accompanying drawings.

In this embodiment, audio information and video information are inputted from, e.g., television broadcasting or a mobile video recorder integrated with a camera, and a desired partial region designated by metadata added to the video information is enlarged so that the user can easily view the desired region on a small-screen display. Also, an operation of partially enlarging an image on the basis of the significance of video information designated by metadata will be explained.

Figure 1:
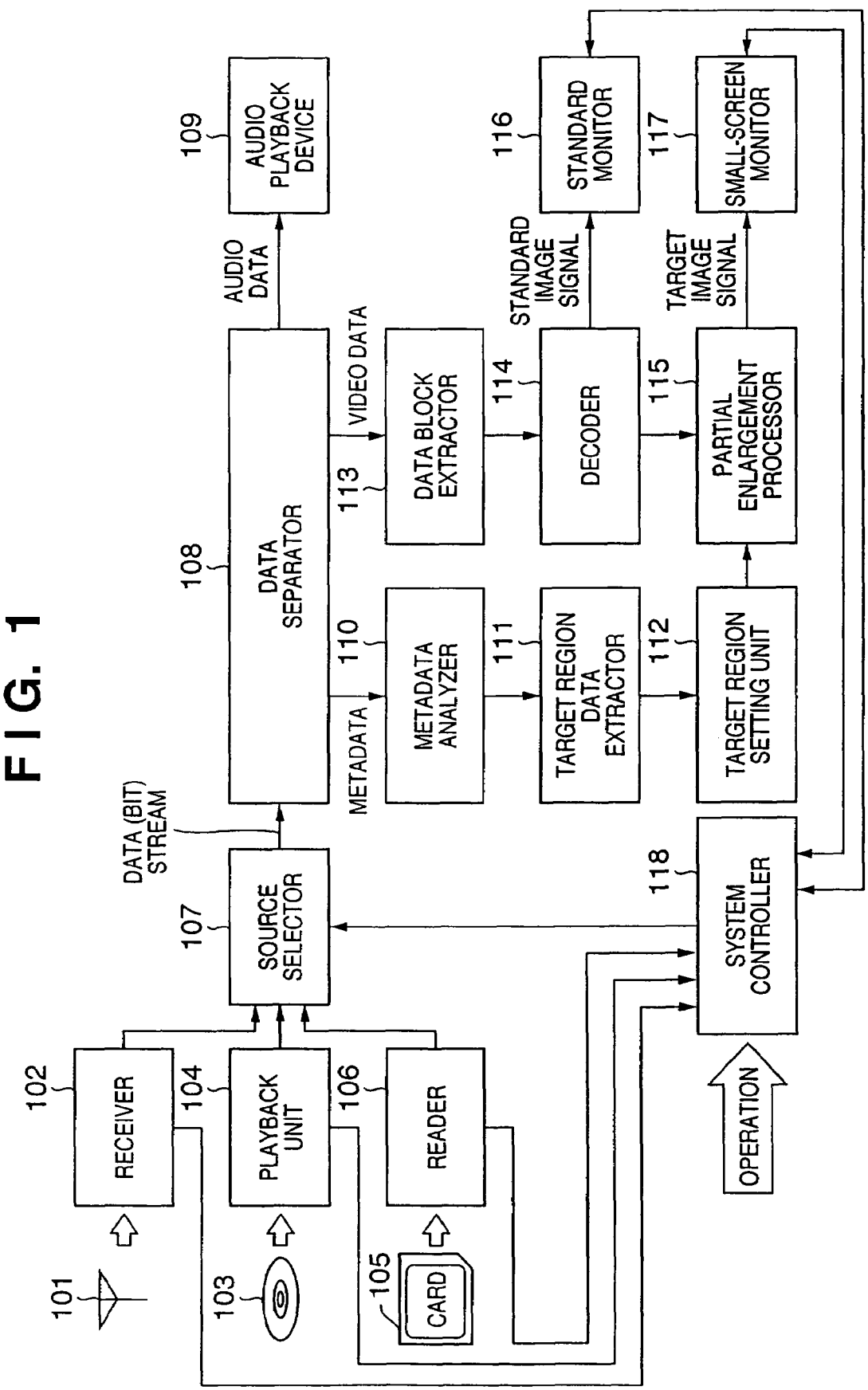
FIG. 1 is a block diagram showing the arrangement of the display side of a video system according to an embodiment.

FIG. 1 is a block diagram showing the arrangement of the display side of a video system according to the embodiment. As shown in FIG. 1, this embodiment assumes the following three types of sources as information input sources.

(1) Broadcasting/communication system
(2) Disk-like recording medium
(3) Semiconductor memory card The above input sources are indicated by symbols of an antenna 101, disk medium 103, and memory card 105. These input sources are supplied as digital data streams to a source selector 107 by a (radio) receiver 102, disk playback unit 104, and memory data reader 106.

A system controller 118 detects a user operation and the presence/absence of the disk medium 103 and memory card 105, and generates a selection control signal to control the selecting operation of the source selector 107. The system controller 118 comprises at least a CPU for controlling the whole system, a ROM for storing programs and control data of the CPU, and a RAM in which a work area and various tables which the CPU uses to execute processing are defined.

The data (bit) stream selected by the source selector 107 in accordance with the selection control signal from the system controller 118 is supplied to a data separator 108. The data separator 108 separates the data (bit) stream into video data as principal data, audio data, and metadata, and outputs the video data to a data block extractor 113, the audio data to an audio playback device 109 such as a loudspeaker, and the metadata to a metadata analyzer 110.

To extract desired sub-information from lots of metadata, the metadata analyzer 110 checks the form of addition of reference information for partial enlargement. The forms of addition are roughly classified into a type (Type-A) in which information concerning the significance is supplied and a partial enlargement region is set on the playback side, and a type (Type-B) in which information for designating a partial enlargement region is directly supplied. The efficiency is increased by changing the type of definition in accordance with whether the shape of region designation is a rectangle, circle, or polygon. The type of information and the difference between the definition methods are discriminated in this manner, and a target region data extractor 111 and target region setting unit 112 (to be described later) extract and set the partial enlargement region.

Note that the sub-information contained in the metadata is automatically or manually generated on the image sensing side.

First, a practical example of the region extracting method of the target region data extractor 111 which extracts the sub-information (partial enlargement region) from the reference information designated by the above type (Type-B) will be explained in order with reference to FIGS. 2 to 5.

Figure 2:
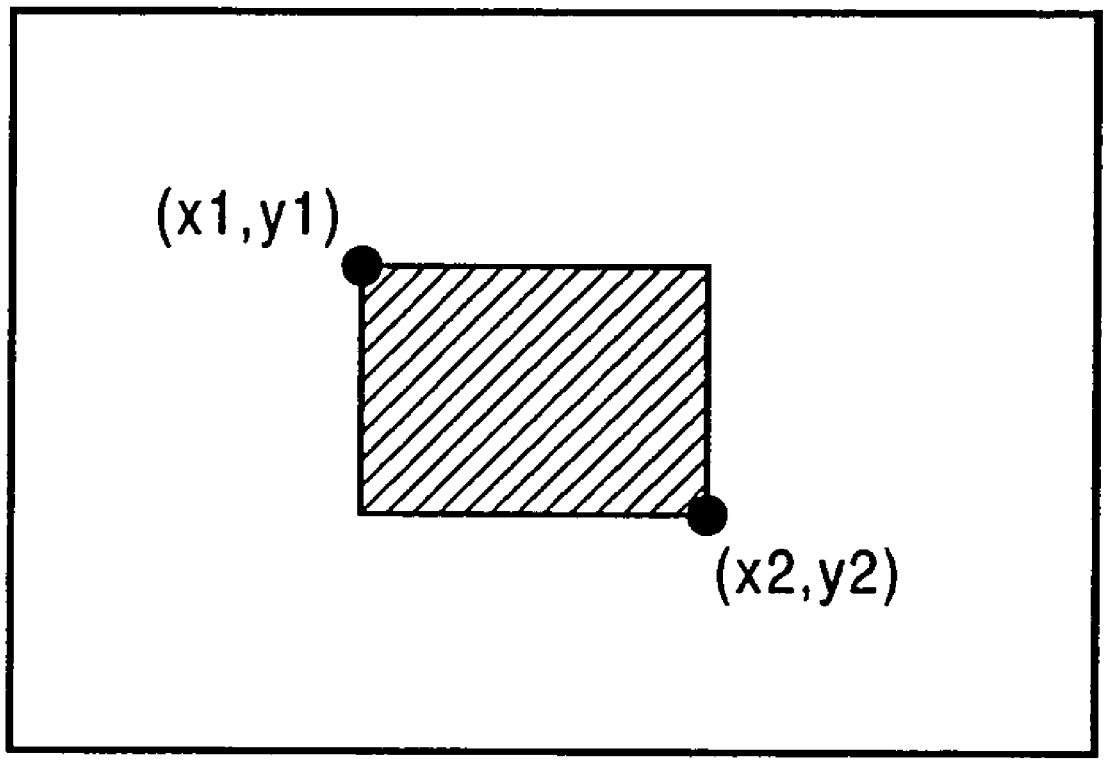
FIG. 2 is a view for explaining an example of a rectangle for direct region designation.

FIG. 2 is a view for explaining an example of a rectangle for direct region designation. In this example shown in FIG. 2, the reference information is a rectangle for direct region designation. As shown in FIG. 2, a partial enlargement region is extracted as a rectangle whose x- and y-coordinates are designated by two points $(x_1,y_1)$ and $(x_2,y_2)$ as the upper left point and lower right point.

Figure 3:
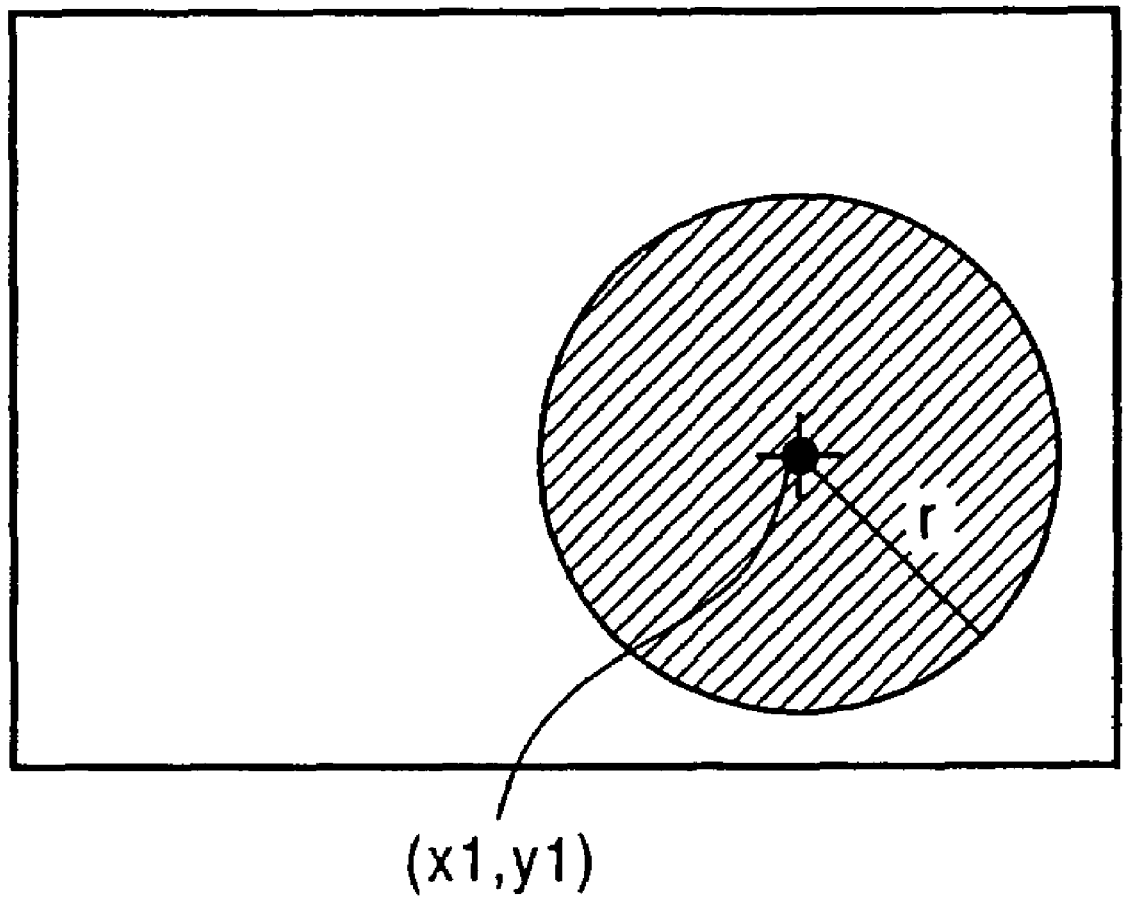
FIG. 3 is a view for explaining an example of a circle for direct region designation.

FIG. 3 is a view for explaining an example of a circle for direct region designation. In this example shown in FIG. 3, the reference information is a circle for direct region designation. As shown in FIG. 3, a partial enlargement region is extracted as a circle defined by a central point $(x_1,y_1)$ and a radius r.

Figure 4:
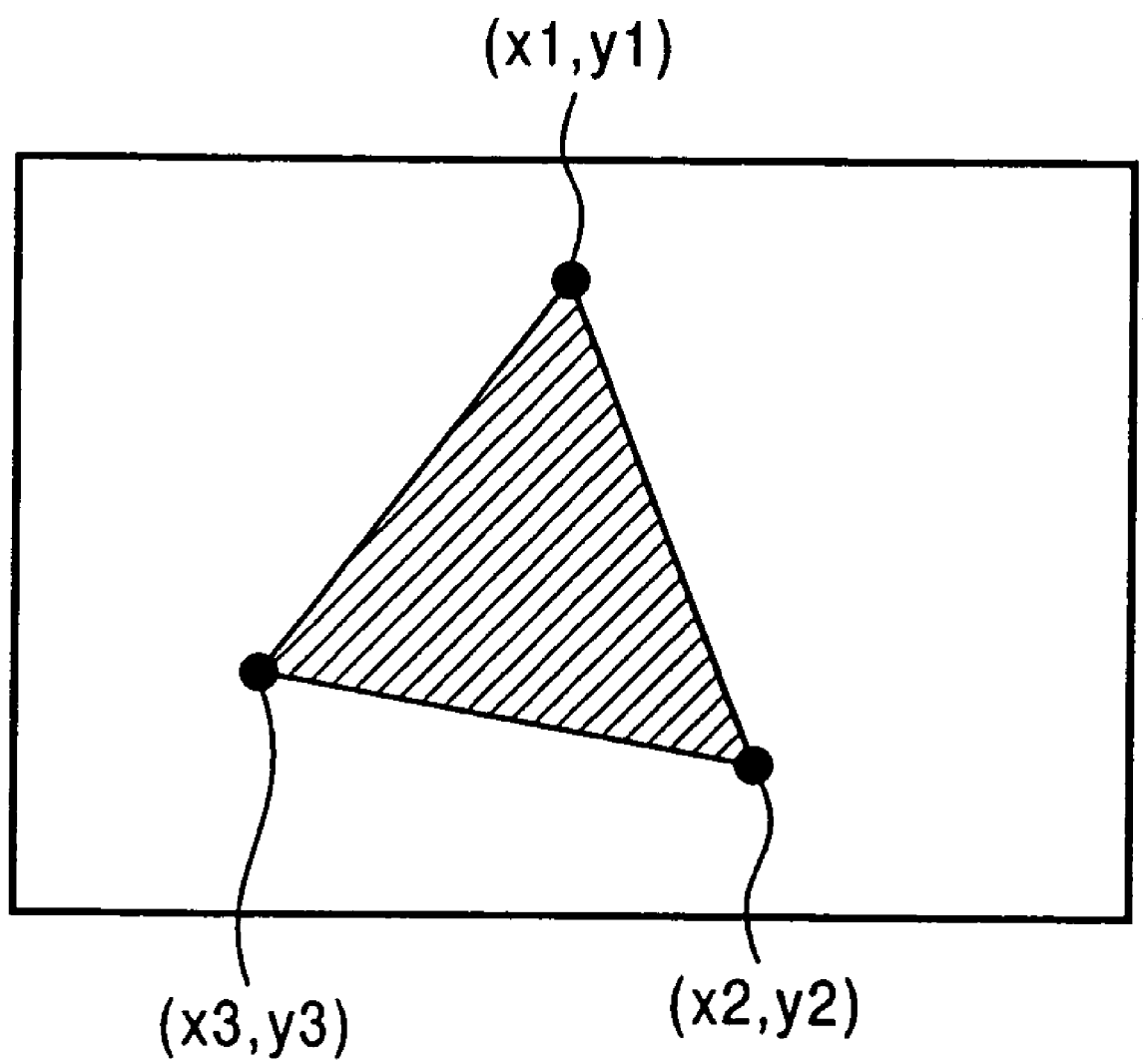
FIG. 4 is a view for explaining an example of a polygon for direct region designation.

FIG. 4 is a view for explaining an example of a polygon for direct region designation. In this example shown in FIG. 4, the reference information is a polygon for direct region designation. As shown in FIG. 4, a partial enlargement region is extracted as a polygon whose coordinates are designated by all the apexes of the polygon.

Figure 5:
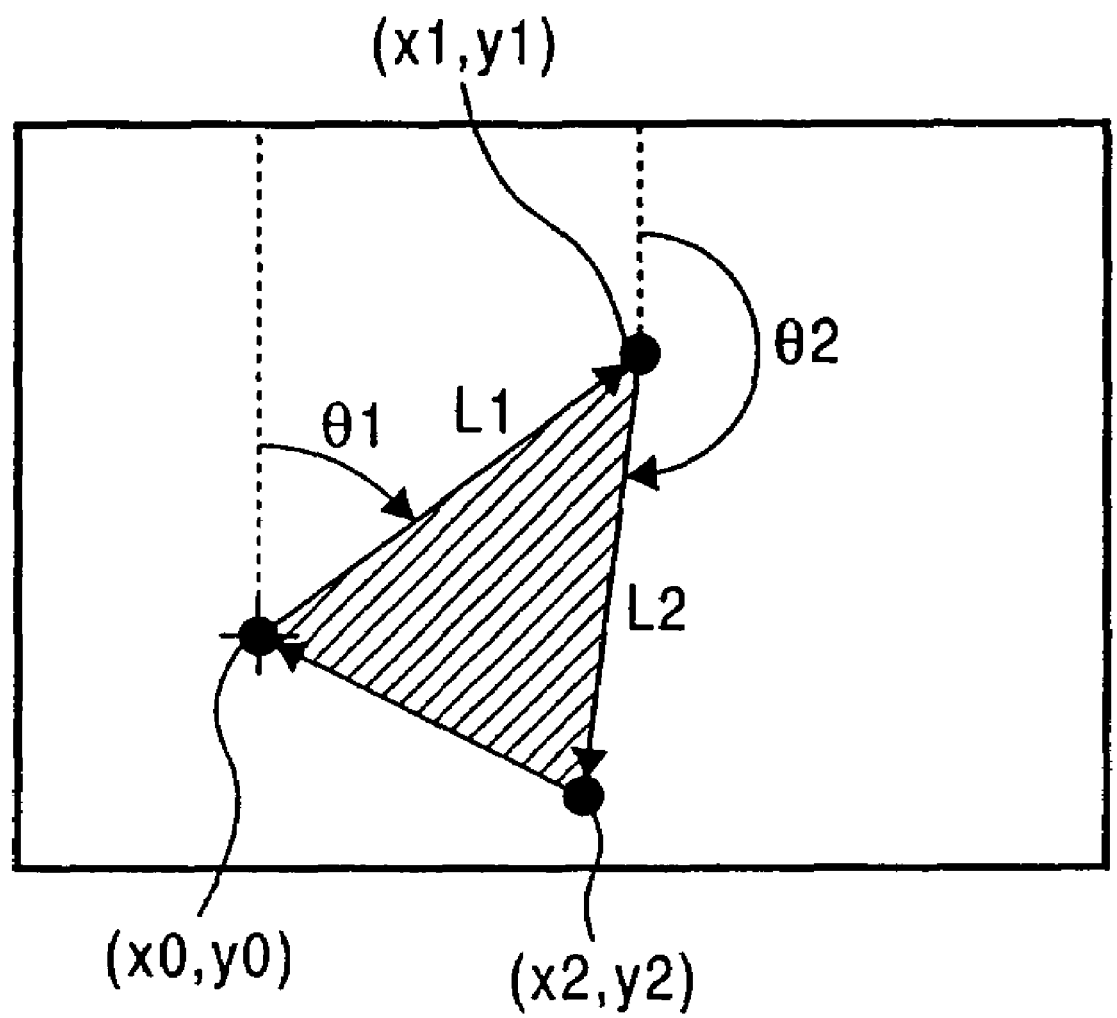
FIG. 5 is a view for explaining an example of a polygon for direct region designation.

FIG. 5 is a view for explaining an example of a polygon for direct region designation. In this example shown in FIG. 5, the reference information is a polygon for direct region designation. As shown in FIG. 5, one apex of the polygon is defined as the starting point, and each adjacent apex is defined by an angle and distance, thereby extracting a partial enlargement region as a polygon connecting all the apexes. More specifically, the angle is indicated by an inclination θ from the y axis, and the length is indicated by a ratio (%) when the length of the diagonal of the reference screen is 100%. It is of course also possible to define the length by another form, e.g., the scalar value of the x- and y-coordinates or the distance expressed by the number of pixels. Points having high significance or the centers of narrow regions are designated by the coordinates. By using this information, a partial enlargement region is appropriately set on the display side.

Next, a practical example of the region setting method of the target region setting unit 112 which sets the sub-information (partial enlargement region) from the reference information designated by the above type (Type-A) will be explained in order with reference to FIGS. 6 to 10.

Figure 6:
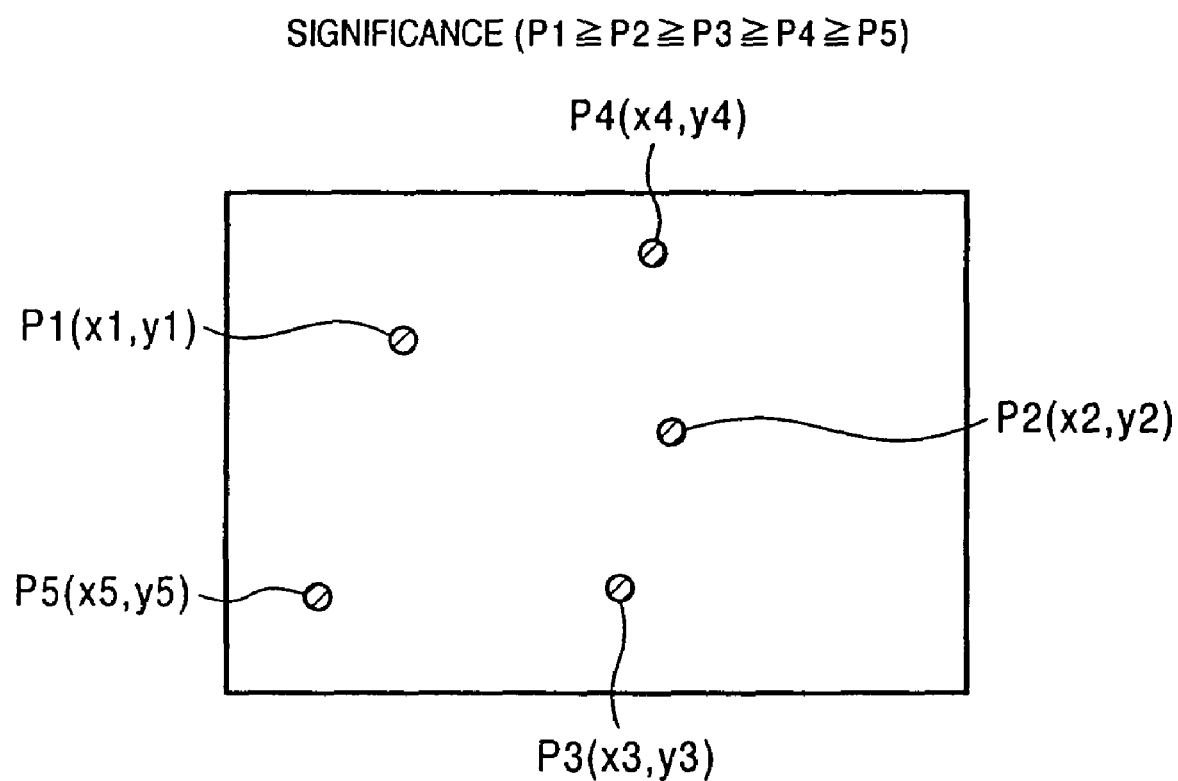
FIG. 6 is a view for explaining the setting of a partial enlargement region in significant point designation.

FIG. 6 is a view for explaining the setting of a partial enlargement region in significant point designation. In this example shown in FIG. 6, the x- and y-coordinates of five points from $P1(x_1,y_1)$ to $P5(x_5,y_5)$ are designated in descending order of significance. A plurality of pieces of coordinate designation information as reference information and video information as principal information are embedded in the metadata, and the metadata is recorded and transmitted.

These pieces of information are received, and a partial enlargement region is calculated and set in accordance with requirements of the playback/display side. As a display method, the level of significance to be displayed is designated, and the smallest region including all points P meeting the condition is determined.

Figure 7:
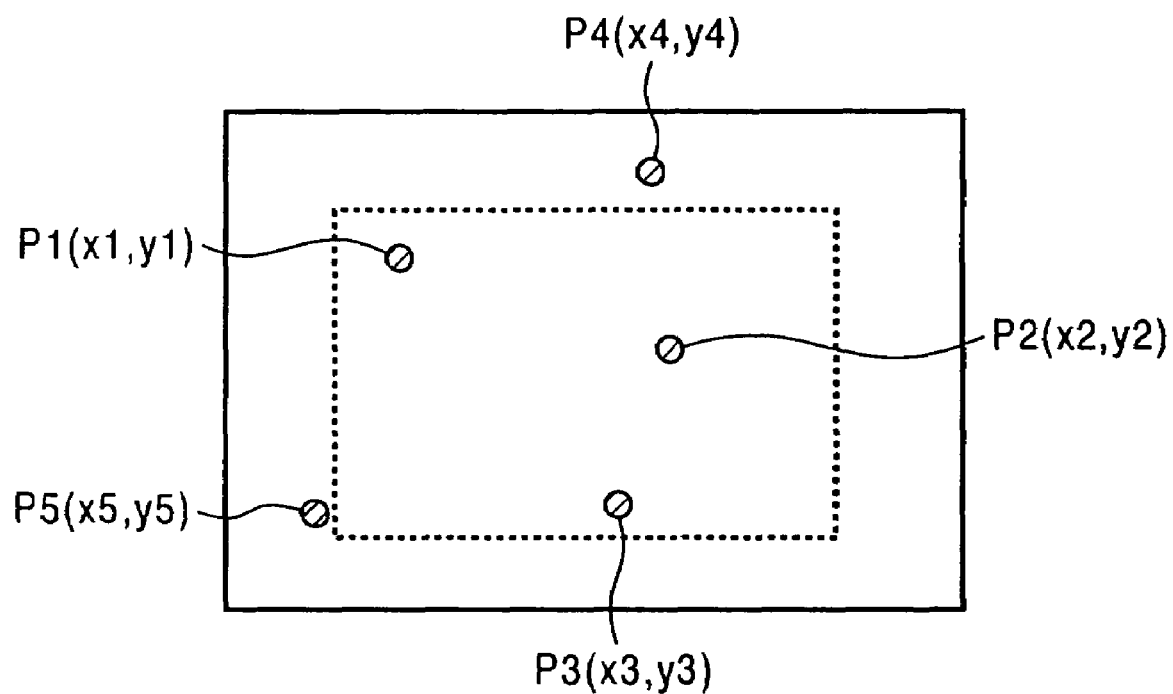
FIG. 7 is a view showing an example of display of the three highest significances.
Figure 8:
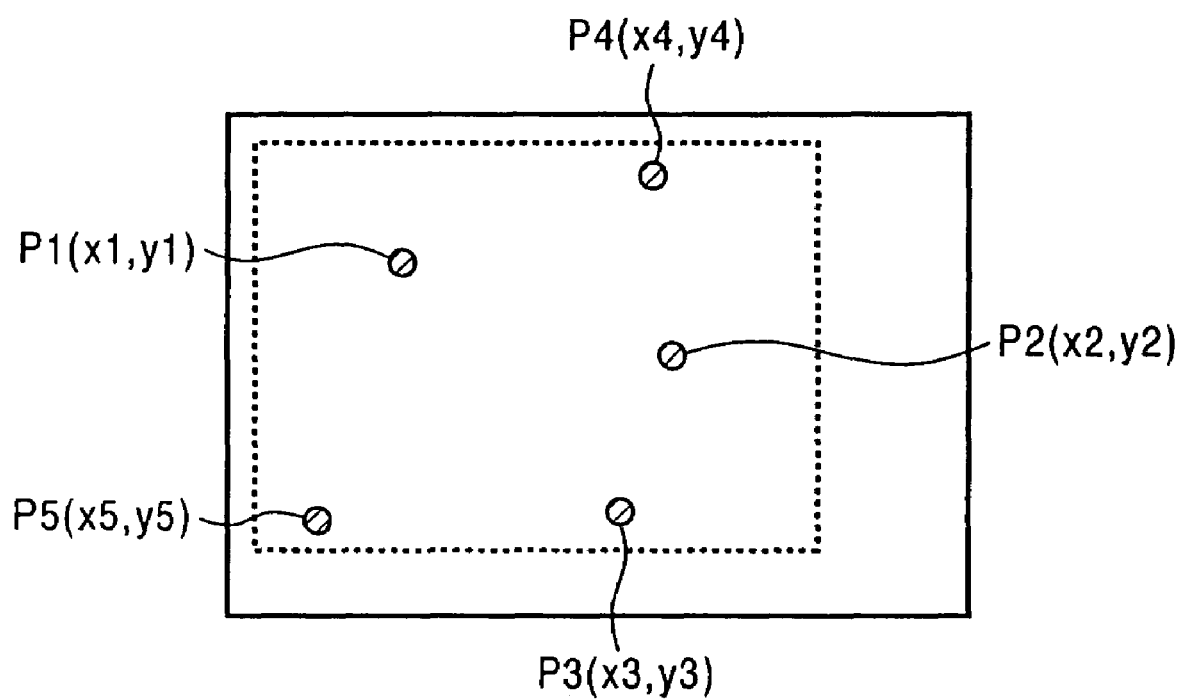
FIG. 8 is a view showing an example of display of the five highest significances.

FIG. 7 is a view showing an example when the three highest significances are to be displayed. FIG. 8 shows an example when the five highest significances are to be displayed. In the display examples shown in FIGS. 7 and 8, the minimum regions are displayed. However, information of interest presumably exists around each point, so a desired region may lack if only the designated coordinates are included. Therefore, better results are obtained by setting a region slightly larger than the minimum region so as to include a portion around each point.

Figure 9:
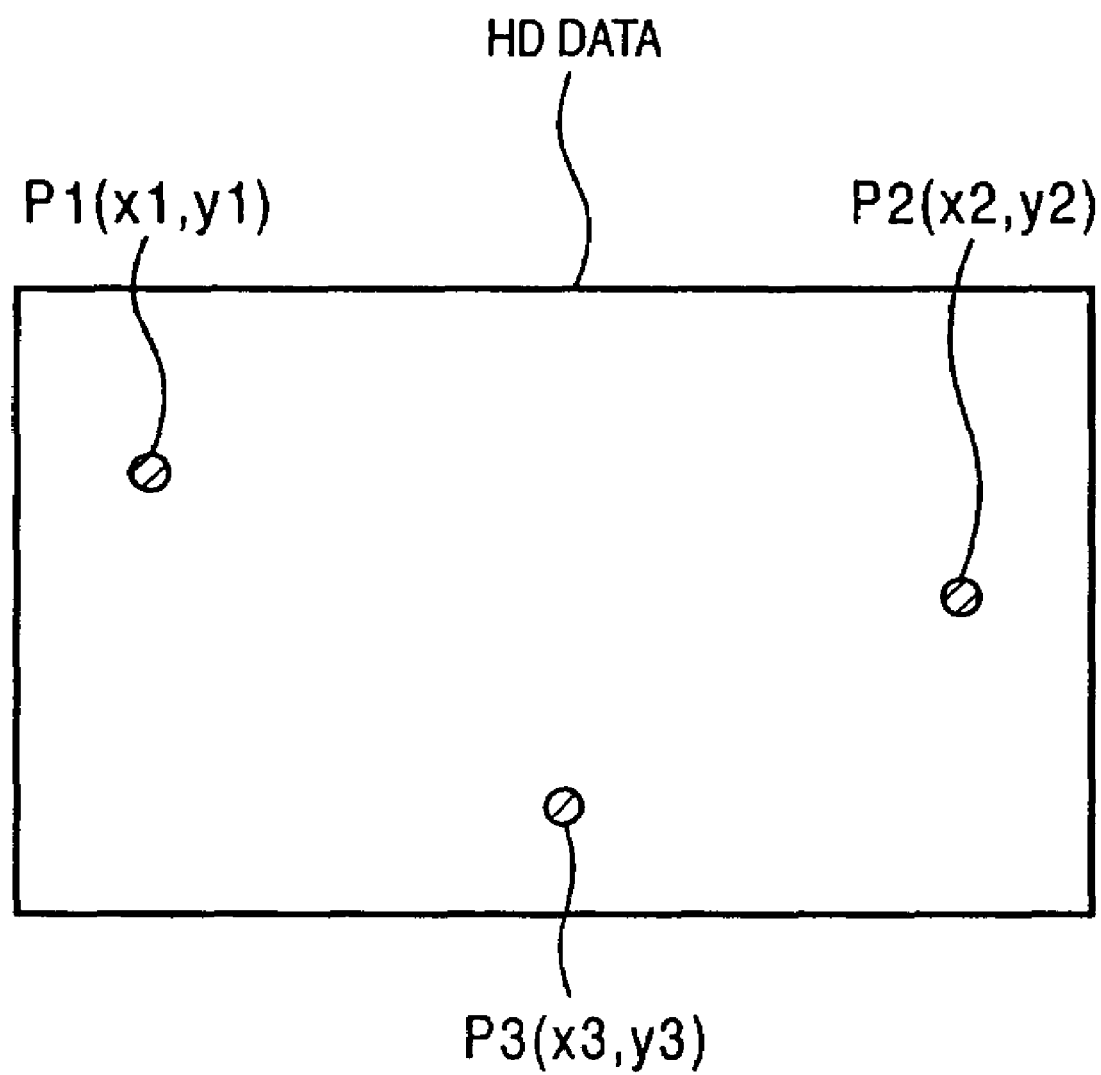
FIG. 9 is a view in which the x- and y-coordinates of three points from $P1(x_1,y_1)$ to $P3(x_3,y_3)$ are designated in descending order of significance on a screen based on the HDTV standard.

FIG. 9 is a view in which the x- and y-coordinates of three points from $P1(x_1,y_1)$ to $P3(x_3,y_3)$ are designated in descending order of significance on a screen based on the HDTV standard. These pieces of coordinate designation information as reference information and HD video information as principal information are embedded in the metadata, and the metadata is recorded and transmitted.

Figure 10:
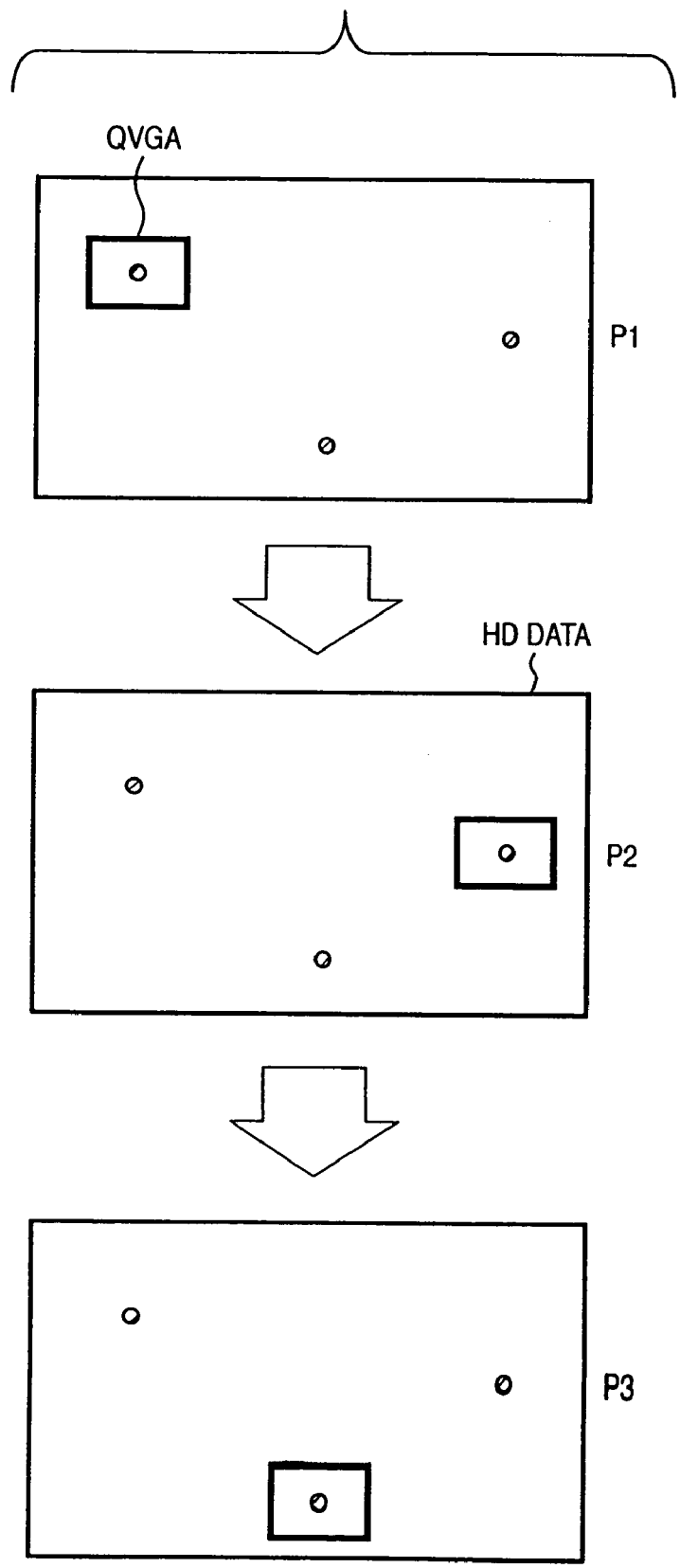
FIG. 10 is a view showing a screen which displays display regions to be switched in accordance with the priority order.

By receiving these pieces of information, a partial enlargement region is calculated and set in accordance with requirements of the playback/display side. As a display method, a region called QVGA having an area of about 1/16 that of the original image is set on the HDTV screen. However, unlike in the method described above, not all the three points are simultaneously displayed, but a QVGA region having the first significant point P1 as its center is first set as a partial enlargement region. If a user wants to display other regions, display regions are switched in descending order of significance, i.e., in accordance with the priority order such as P1→P2→P3, whenever a selecting operation is performed (e.g., whenever a NEXT button is pressed). FIG. 10 illustrates this processing.

The relationship between the whole data (bit) stream, AV (Audio and Video) data, and metadata input from each source will be explained in detail below.

Figure 11:
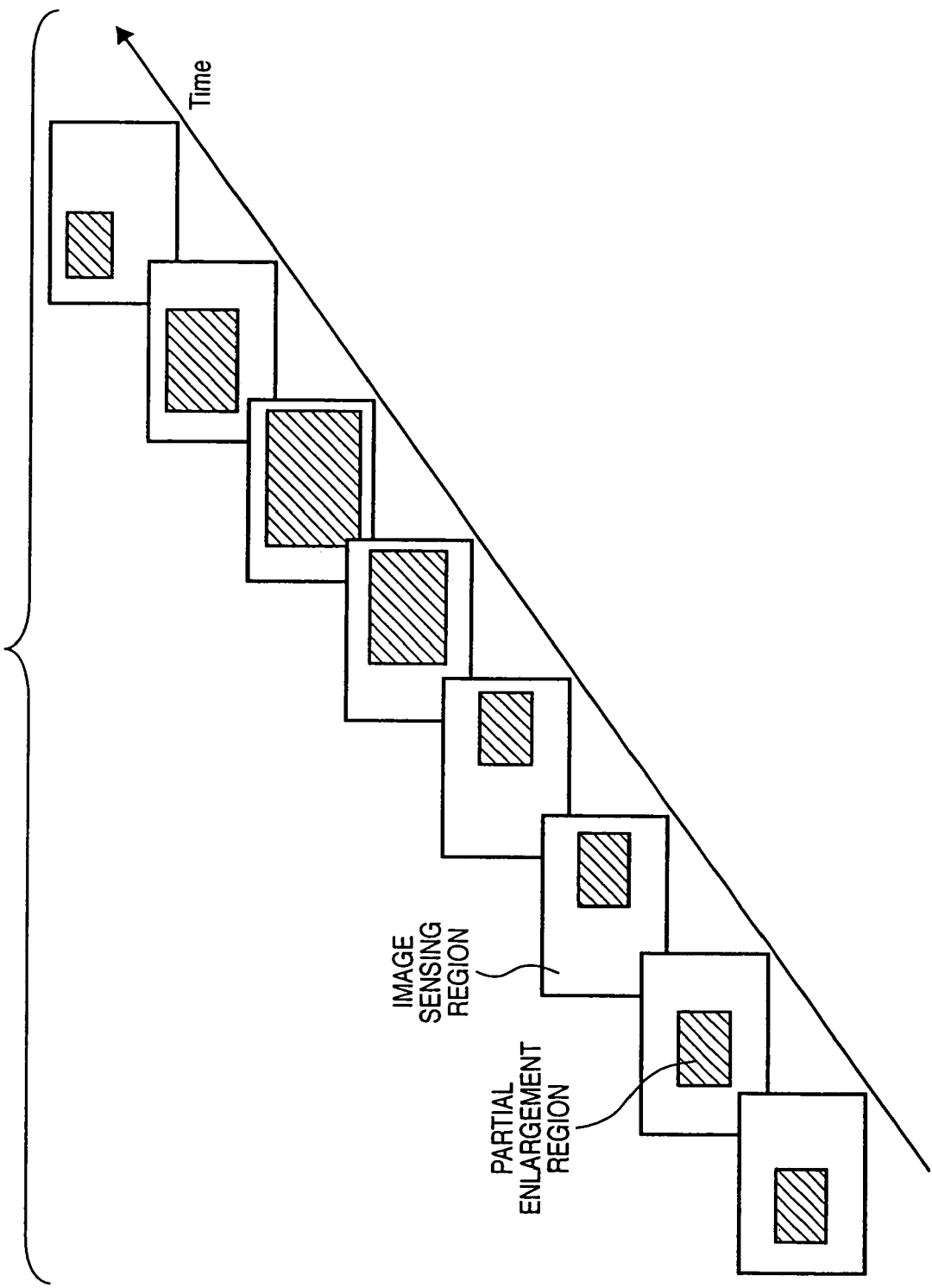
FIG. 11 is a view showing, along the time axis, the relationship between a whole image sensing region and a partial enlargement region when the partial enlargement region is directly designated.

FIG. 11 is a view showing, along the time axis, the relationship between a whole image sensing region and a partial enlargement region when the partial enlargement region is directly designated. When a motion image is to be displayed, a partial enlargement region must be set in all frames of the motion image.

FIG. 11 shows the way the partial enlargement region changes from one frame to another. However, the partial enlargement region may also be fixed by designating an arbitrary key frame. For example, it is also possible to designate, as a fixed partial enlargement region, a region of a news material image displayed as a background of an announcer in a news program.

The structure of the data (bit) stream will be explained below.

Figure 12:
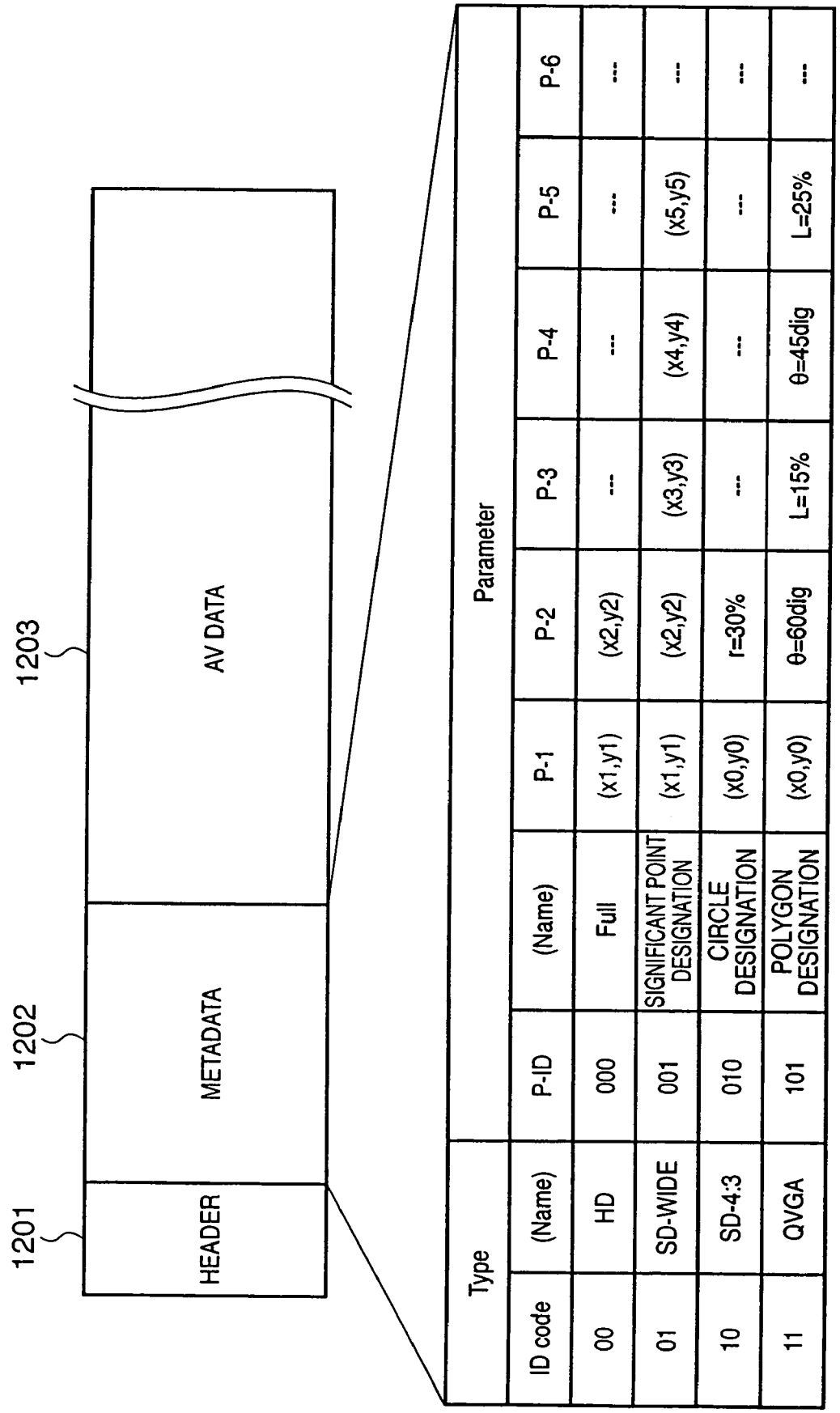
FIG. 12 is a view showing an arrangement when a data (bit) stream is divided into predetermined units (e.g., GOP of MPEG)

FIG. 12 is a view showing an arrangement when the data (bit) stream is divided into predetermined units (e.g., GOP: Group of Pictures of MPEG). In FIG. 12, reference numeral 1201 denotes a header in which various IDs and parameters are described; and 1202, metadata which basically contains the date of creation, the creator, the title, thumbnail images, copyright information, and the time code. When the apparatus is a so-called stationary apparatus, program information (e.g., the broadcasting station, the date of broadcasting, and the cast) is recorded in accordance with the TV program or the software on the market. When the apparatus is a camcorder or the like, camera-related information (e.g., zoom, focus, iris, shutter, and gain) is recorded. Reference numeral 1203 denotes AV data. Details of this AV data 1203 will be described later.

Referring to FIG. 12, only the significance information and partial enlargement region designation information pertaining to the present invention are shown, and none of the above-mentioned information is illustrated. However, all of these pieces of information are of course recorded together.

Also, in this example shown in FIG. 12, metadata is set for each GOP (the basic unit of an image group for each I picture of MPEG: GOP is usually made up of 15 frames). As described above, however, a partial enlargement region must be set in all frames in the actual display process. Therefore, it is also possible to hold the same region setting in the GOP, or change the setting from one frame to another by performing region interpolation from GOPs before and after the region.

In this case, calculations are performed by the target region setting unit 112 shown in FIG. 1.

As shown in FIG. 12, the type of display image data is identified by an ID code having two bits on the left end. The relationship between this ID code and the type is determined as follows.

00: HD (high definition television) standard
  (9:16 wide aspect)
01: SD-WIDE (standard definition)
  9:16 wide aspect
10: SD (standard definition)
  3:4 standard aspect
11: QVGA (screen size of about 1/4 of SD)

Sub-information for setting an enlargement region is expressed by a 3-bit identification code called P-ID in the parameter column.

000: A full mode in which an image is displayed on the full screen. If the sizes of an original image and display image are the same, no conversion for partial enlargement is necessary, so the image is displayed in the full mode. If two-point display is to be performed, the upper left point and lower right point are designated.

001: A significant point information mode in which coordinate points are stored in P-1 to P-6 in descending order of significance.

010: A significant region is designated as a circle, so the central point and radius are stored in P-1 and P-2, respectively. When the image is to be displayed, the minimum partial enlargement region including this circle is set in accordance with the aspect ratio of the display screen.

101: A polygon is set by angles and distances, and these angles and distances are stored by pairing P-2 and P-3 from P-1 as the starting point.

The audio data and video data separated by the data separator 108 shown in FIG. 1 will be described below.

Figure 13:
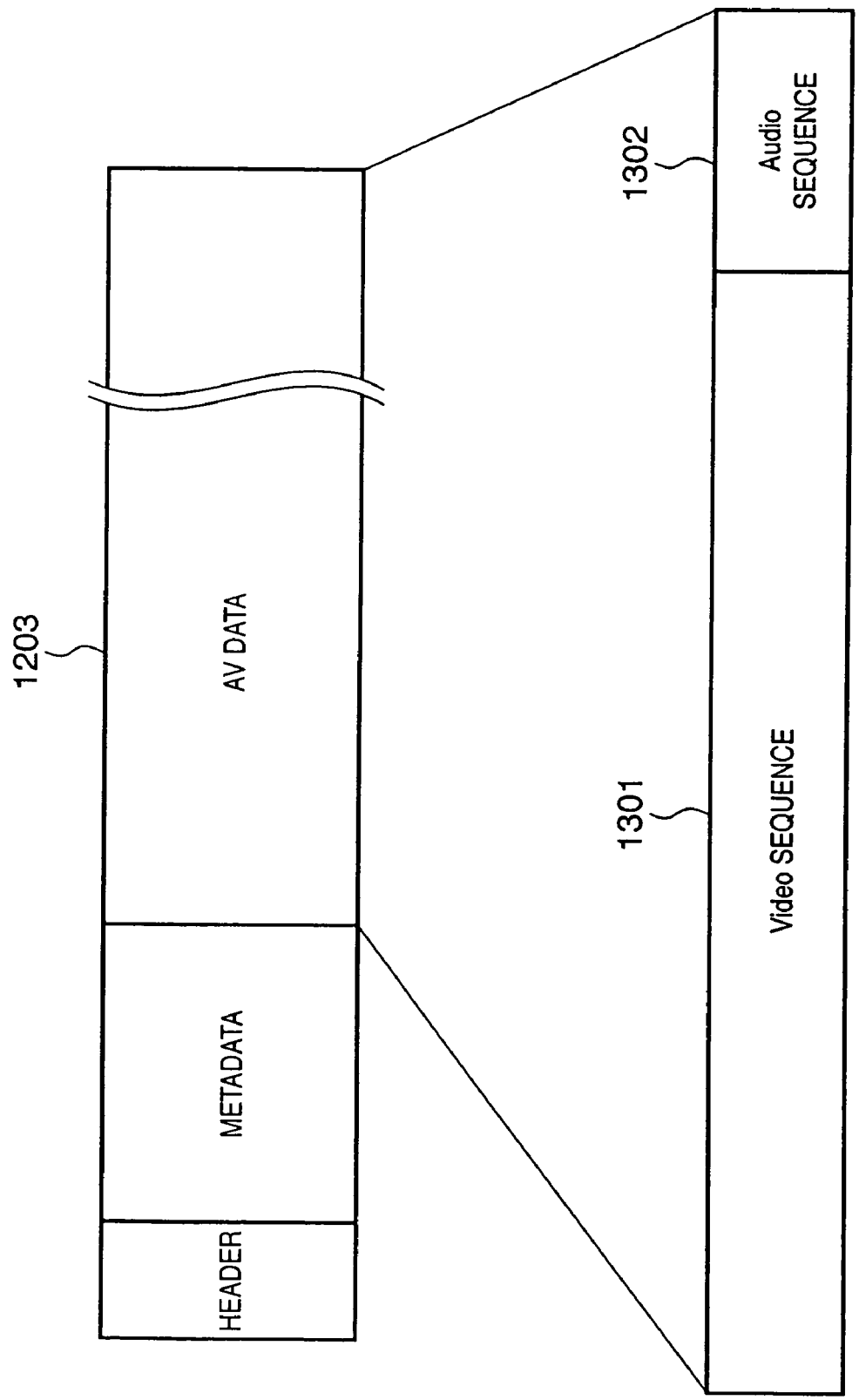
FIG. 13 is a view showing an example of AV (Audio and Video) data.

FIG. 13 is a view showing an example of the AV (Audio and Video) data. In this example shown in FIG. 13, the data is made up of a video sequence 1301 and audio sequence 1302 as data rows.

Figure 14:
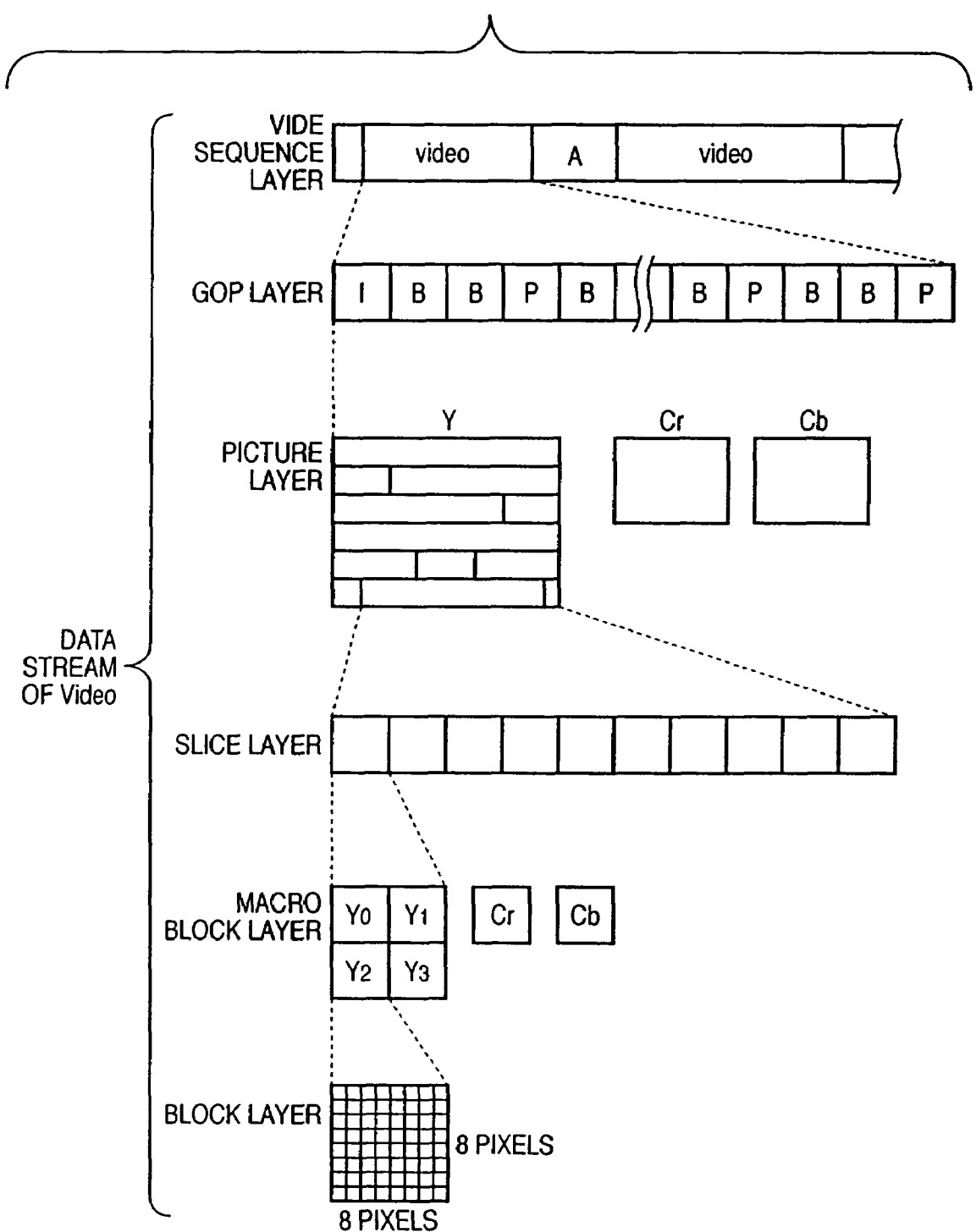
FIG. 14 is a view showing details of a data (bit) stream of video data.

FIG. 14 is a view showing details of the data (bit) stream of the video data. FIG. 14 hierarchically shows the structure of image data downward. This structure is a typical structure of MPEG. As shown in FIG. 14, a video field in a video sequence layer is made of a GOP layer, and encoded by three types of encoding algorithms I, P, and B. Also, one GOP is generally made up of 15 frames IBBPBBPBBPBBPBB.

The lower layer is a picture layer made up of Y (luminance), Cr, and Cb (color), and the next lower layer is a slice layer made up of data (macro) blocks having a predetermined unit. The next lower layer is a macro block layer. When 4:1:1, Y has four blocks, and each of Cr and Cb has one block. The lowermost layer is a block layer which is a pixel block made up of 8×8=64 pixels.

Of these data blocks (macro block and pixel block), the data block extractor 113 extracts a necessary data block, and a decoder 114 executes decoding corresponding to the encoding algorithm to rasterize the data into pixel information. A partial enlargement processor 115 enlarges the rasterized pixel information with respect to the partial enlargement region which is extracted and set by the target region data extractor 111 and target region setting unit 112.

Figure 15:
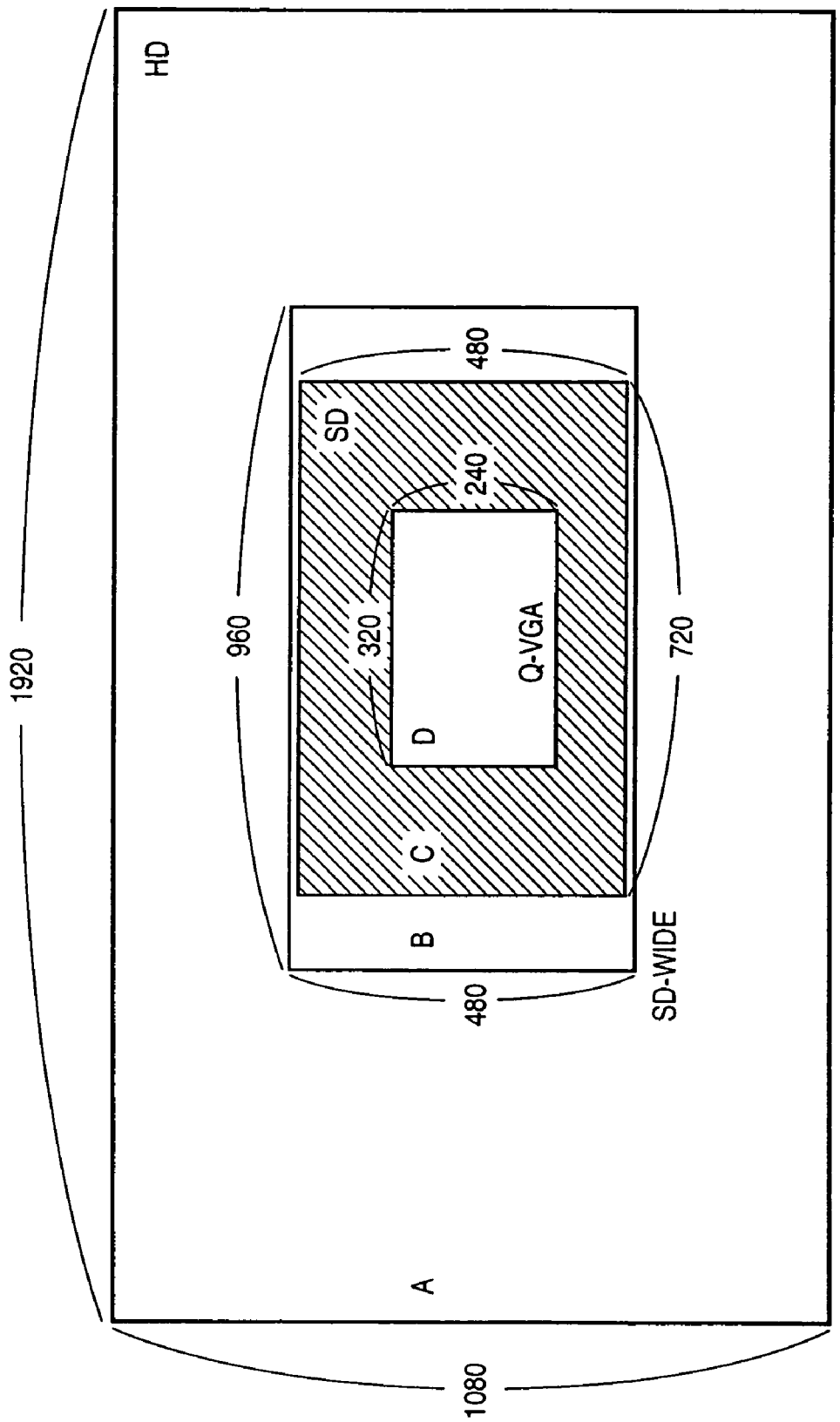
FIG. 15 is a view showing the relationships between the display regions of a plurality of broadcasting standards.

FIG. 15 is a view showing the relationship between the display regions of a plurality of broadcasting standards. As shown in FIG. 15, the area decreases in the order of HD (region A), SD-WIDE (region B), SD (region C), and Q-VGA (region D). Each partial enlargement region is set within these regions of the above standards.

For example, to display an image (region A) produced by the HD standard on a display device (small-screen monitor) corresponding to the SD standard (region C), a partial enlargement region is set within a range narrower than the region C. Information of the thus set partial enlargement region is supplied to the partial enlargement processor 115, which executes a partial enlargement process that enlarges this partial enlargement region to an area equivalent to the region C. That is, the information having undergone the partial enlargement process is supplied to the display device corresponding to the SD standard (region C), and displayed. To cut out the image by a frame equivalent to the region C, simple trimming is executed without any enlargement.

As described above, a standard image signal is output from the decoder 114 and supplied to a standard monitor 116, and the image is displayed by the original source size, e.g., the HD size. On the other hand, a signal having undergone the partial enlargement process in the partial enlargement processor 115 is supplied to a small-screen monitor 117, and the image is displayed by a size suited to the small screen.

Whether to turn on or off the display screen of each monitor is determined by the system controller 118 in accordance with, e.g., a user's operation or the presence/absence of a storage medium. The system controller 118 appropriately outputs instructions to the monitors 116 and 117.

In this embodiment as described above, an image can be well displayed on a small screen by using metadata added to video information. This effectively solves the problems of the conventional techniques.

In particular, the above effect can be obtained during viewing without any operation by a viewer, and automatization is also possible.

Also, a standard signal and partially enlarged signal can be selected in accordance with whether to use a standard monitor or small-screen monitor. This improves the operability.

In this embodiment, the video system includes a standard monitor and small-screen monitor, and displays a desired partial image on the small-screen monitor by enlarging the image. However, the present invention is not limited to this embodiment, and is applicable to any case in which a desired partial image is to be displayed on a small-screen display device. Examples are a case in which programs of television broadcasting are to be viewed on a cell phone or the like, and a case in which programs are to be played back by using the DVD playback function of a car navigation system.

[Other Embodiment]

Another embodiment according to the present invention will be described below with reference to the accompanying drawing.

In the other embodiment, a partial region is selected by using attributes of video information, and well displayed on a small screen.

The arrangement of the display side of a video system of the other embodiment is the same as that shown in FIG. 1, so a detailed description thereof will be omitted. In the other embodiment, a target region setting unit 112 sets a partial enlargement region on the basis of the attributes of video information designated in advance.

Figure 16:
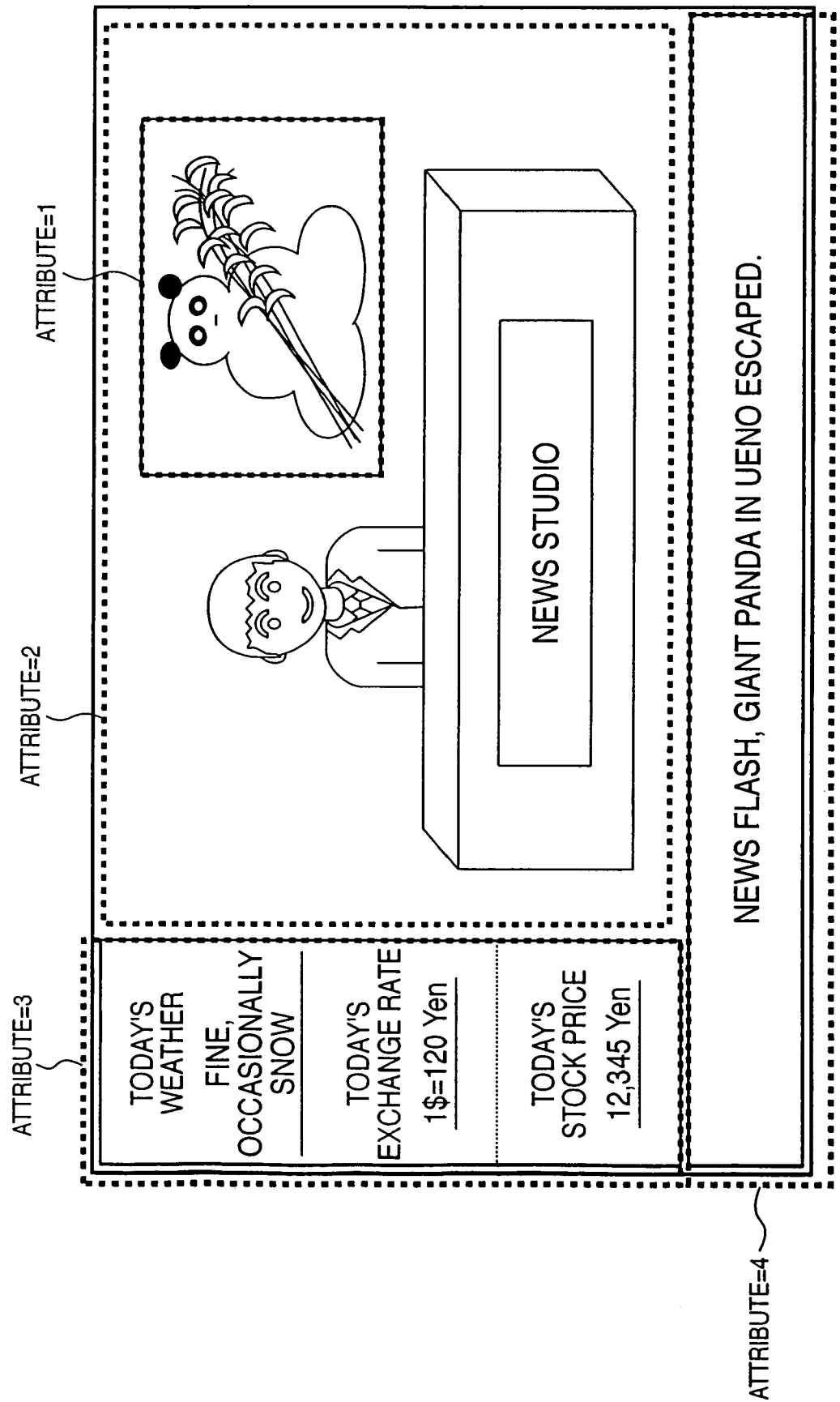
FIG. 16 is a view showing an image display having undergone a partial enlargement process according to another embodiment.

FIG. 16 is a view showing an image display having undergone a partial enlargement process in the other embodiment. As shown in FIG. 16, the attributes are roughly classified into attributes 1 and 2 for motion images, and attributes 3 and 4 for characters.

These attributes are more finely classified as follows. Attribute 1 indicates a news material image, and is a video attribute having the highest news value. Attribute 2 indicates a studio image, and has a low priority order in respect of the news value. Attribute 3 indicates character information, i.e., information having a relatively low updating frequency, and has a low priority order in respect of the news value. Attribute 4 also indicates character information, and is a character attribute having a high unexpected news value. A region to be partially enlarged is set by using these attributes.

Note that these attributes need only be set for a predetermined period such as each cut, and they need not be set for each frame.

Attribute 1 is suited as a significant region of video information. Therefore, a motion image region corresponding to attribute 1 is cut out, partially enlarged, so as to match the output standard, by a partial enlargement processor 115 of the block diagram shown in FIG. 1, and displayed on a small-screen monitor 117.

It is also possible to display motion image and character attributes 2 and 3 having a low news value on a standard monitor 116, and display character attribute 4 having a high news value on the small-screen monitor 117.

For example, control can be performed such that a motion image of attribute 1 is displayed on the main screen of a two-screen cell phone, and character information of attribute 4 is displayed on the sub screen.

In the other embodiment as described above, a region to be displayed can be divided on the basis of the attributes of video information, and displayed after having undergone a partial enlargement process.

Also, a main (standard) monitor and sub (small-screen) monitor can be selectively used to display an image in accordance with each attribute of video information.

The present invention can be applied to a system constituted by a plurality of devices (e.g., a host computer, interface, reader, and printer) or to an apparatus (e.g., a copying machine or facsimile apparatus) comprising a single device.

Further, the object of the present invention can also be achieved by supplying a storage medium storing the program code of software for implementing the functions of the above embodiments to a system or apparatus, and reading out and executing the program code stored in the storage medium by a computer (or a CPU or MPU) of the system or apparatus.

In this case, the program code read out from the storage medium implements the functions of the present invention, and the storage medium storing this program code constitutes the invention.

As this storage medium for supplying the program code, it is possible to use, e.g., a floppy (registered trademark) disk, hard disk, optical disk, magnetooptical disk, CD-ROM, CD-R, magnetic tape, nonvolatile memory card, and ROM.

Furthermore, besides the functions of the above embodiments are implemented by executing the readout program code by the computer, the present invention includes a case where an OS (Operating System) or the like running on the computer performs part or the whole of actual processing in accordance with designations by the program code and thereby implements the functions of the embodiments.

Furthermore, the present invention also includes a case where the program code read out from the storage medium is written in a memory of a function expansion board inserted into the computer or of a function expansion unit connected to the computer, and, in accordance with designations by the program code, a CPU or the like of the function expansion board or function expansion unit performs part or the whole of actual processing and thereby implements the functions of the above embodiments.

In each embodiment as described above, a desired partial image can be enlarged and displayed on a small-screen display device without any cumbersome operation by a user.

As many apparently widely different embodiments of the present invention can be made without departing from the spirit and scope thereof, it is to be understood that the invention is not limited to the specific embodiments thereof except as defined in the appended claims.

What is claimed is:

1. A video display method of a video system for displaying input video data, the video system being connectable to a specific small-screen display device and a standard-screen display device having a larger screen than that of the small-screen display device, comprising:
   a step of inputting video data and sub-information to designate that a partial video region of the input video data is displayed on the small-screen display device, wherein the partial video region is determined on the basis of a screen size of the small-screen display device;
   a step of extracting video data of the partial video region;
   a step of enlarging the extracted video data to the screen size of the small-screen display device in accordance with the input sub-information; and
   a step of supplying at least one of (a) the enlarged video data corresponding to the partial video region to the small-screen display device, and (b) standard video data based on the input video data to the standard-screen display device, to be displayed selectively or simultaneously.

2. The method according to claim 1, wherein the input sub-information includes two dimensional region information for designating the partial video region.

3. The method according to claim 1, wherein the input sub-information includes information indicating significance of the partial video region.

4. The method according to claim 3, wherein when the information indicating significance is designated for a plurality of partial video regions, video data of the partial video regions is extracted and enlarged in descending order of significance in the extracting step and the enlarging step.

5. The method according to claim 1, wherein the input sub-information includes information indicating an attribute of the video data.

6. The method according to claim 5, wherein the attribute of the video data identifies at least any one of a motion image, still image, and character.

7. The method according to claim 6, wherein the video system comprises the small screen display device and a standard display device, and displays an image on each display device in accordance with the attribute of the video data.

8. The method according to claim 1, further comprising a step of generating and recording sub-information corresponding to the video data, when recording the video data.

9. An image processing apparatus for processing input video data, the image processing apparatus being connectable to a specific small-screen display device and a standard-screen display device, comprising:
   input means for inputting video data and sub-information to designate that a partial video region of the input video data is displayed on the small-screen display device, wherein the partial video region is determined on the basis of a screen size of the small-screen display device;
   processing means for extracting video data of the partial video region, and for enlarging the extracted video data to the screen size of the small-screen display device in accordance with the input sub-information; and
   supply means for supplying the video data of the partial video region extracted and enlarged by said processing means to said small-screen display device specified by the input sub-information, and for supplying the input video data to the standard-screen display device, to be displayed selectively or simultaneously.

10. A program for allowing a computer to execute the method cited in claim 1.

11. A computer-readable recording medium recording the program cited in claim 10.

12. An image processing apparatus for processing received video data, the image processing apparatus being connectable to a specific small-screen display device and a standard-screen display device, comprising:
   a receiver configured to receive video data and metadata to designate that a partial video region of the received video data is displayed on the small-screen display device, wherein the partial video region is determined on the basis of a screen size of the small-screen display device;
   an extracting and enlarging circuit configured to extract video data of the partial video region, and to enlarge the extracted video data to the screen size of the small-screen display device in accordance with the received metadata; and
   a supplying circuit configured to supply the video data of the partial video region extracted and enlarged by said extracting and enlarging circuit to the small-screen display device specified by the received metadata, and to supply the received video data to the standard-screen display device, to be displayed selectively or simultaneously.

13. An image processing apparatus for processing reproduced video data, the image processing apparatus being connectable to a specific small-screen display device and a standard-screen display device, comprising:
   a player configured to reproduce video data and metadata to designate that a partial video region of the reproduced video data is displayed on the small-screen display device, wherein the partial video region is determined on the basis of a screen size of the small-screen display device;
   an extracting and enlarging circuit configured to extract reproduced video data of the partial video region, and to enlarge the extracted video data to the screen size of the small-screen display device in accordance with the reproduced metadata; and
   a supplying circuit configured to supply the video data of the partial video region extracted and enlarged by said extracting and enlarging circuit to the small-screen display device specified by the received metadata, and to supply the reproduced video data to the standard-screen display device, to be displayed selectively or simultaneously.

* * * * *